Nov. 3, 1970 R. F. ANCHA 3,538,254

AUTOMATIC SOUND SYSTEM WITH A PLURALITY OF MICROPHONES

Filed July 30, 1968 3 Sheets-Sheet 1

Inventor
Robert F. Ancha
By: Olson, Trexler, Wolters & Bushnell attys.

AUTOMATIC SOUND SYSTEM WITH A PLURALITY OF MICROPHONES

Filed July 30, 1968 3 Sheets-Sheet 2

Inventor
Robert H. Ancha
By: Olson, Trexler, Wolters & Bushnell attys.

Inventor
Robert F. Ancha
By: Olson, Trexler, Wolters & Bushnell
attys

United States Patent Office 3,538,254
Patented Nov. 3, 1970

3,538,254
AUTOMATIC SOUND SYSTEM WITH A PLURALITY OF MICROPHONES

Robert F. Ancha, Arlington Heights, Ill. (% Ancha Electronics Inc., 7055 W. Higgins Ave., Chicago, Ill. 60656)

Filed July 30, 1968, Ser. No. 748,810
Int. Cl. H04r 27/00
U.S. Cl. 179—1 5 Claims

ABSTRACT OF THE DISCLOSURE

A sound system comprises a source of direct current power and a first and a second plurality of electrical conductors arranged respectively as the columns and rows of a rectangular matrix. These two sets of electrical conductors are connectible respectively to the positive and negative terminals of the power source, and the sound system of the invention further comprises a number of microphone and switching circuits which are adapted to be installed individually at the seats of an auditorium arrangement. Each of the microphone and switching circuits includes a control relay having a coil connected to one of the first set of conductors and to one of the second set of conductors that forms a matrix junction with the first conductor. A microphone is connectible to a loudspeaker arrangement through contacts of the control relay, and the sound system further comprises an information circuit that is connected between the power source and the control relay for use in selectively completing and breaking circuits from the microphone to the loudspeaker arrangement.

This invention relates generally to communication systems and more particularly to communication systems that involve collecting and amplifying sound waves of the human voice.

In many types of auditorium arrangements, it is desired to have amplification of speech from the audience as well as from the speaker's platform. Conventional systems for providing sound amplification of audience participation ceremonies either have encountered pick-up difficulties where the number of audience microphones was kept to a minimum or have exhibited complicated and expensive cable bundles where microphone coverage was more extensive. These prior art systems have also been plagued with the problem of audible output from the loudspeakers being picked up by the audience microphones and fed back to the corresponding loudspeaker amplifiers as disconcerting background noise. The existing systems have also proved difficult to operate, and considerable embarrassment to the audience participants has been caused when the console operator has failed to energize the proper microphone within a reasonable period of time after the speaker rose to make his address.

Therefore, an important object of the present invention is to overcome the difficulties of the prior art and provide an audience participation sound system that affords superior microphone coverage, simplified cable arrangements, high sound fidelity and easy operation.

Another object of the invention is to provide an audience participation sound system which features automatic cancellation of previously energized audience microphones when a speaker has finished and has resumed his seat.

Still another object of the invention is to provide an audience participation sound system which allows elective cancellation of previously energized audience microphones.

Yet another object of the invention is to provide an audience participation sound system that is easy to install and maintain.

These and other objects and features of the invention will become more apparent from a consideration of the following descriptions.

The invention, both as to its construction and its mode of operation, will be better understood by reference to the following disclosure and drawings forming a part thereof, wherein.

Figures 1, 2:
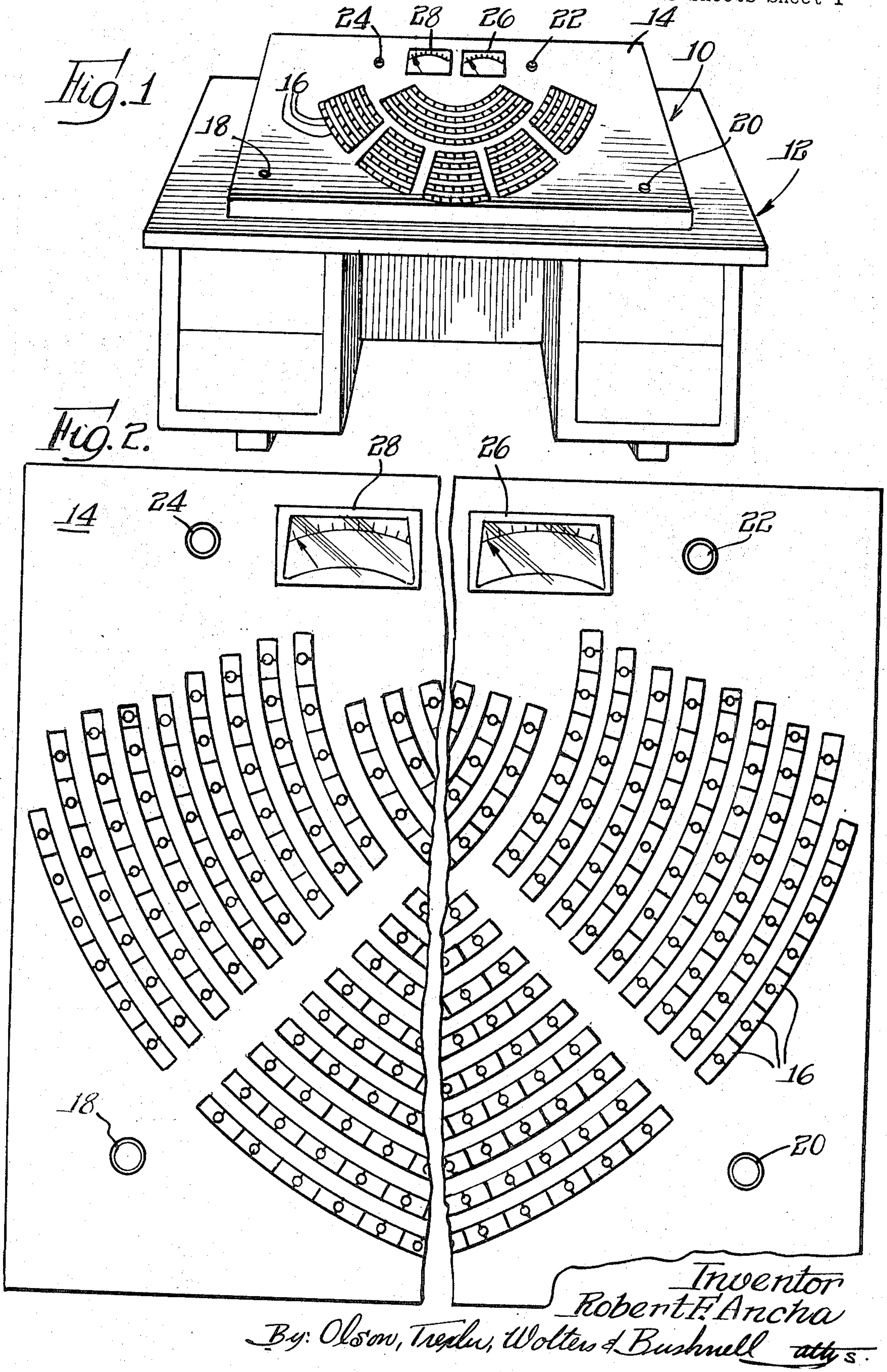
FIG. 1 is a perspective view of a control console of the type contemplated by the present invention for installation in an auditorium location having a clear view of the entire seating arrangement.
FIG. 2 is an enlarged plan view of the control panel employed in the console of FIG. 1.

Referring now in detail to the drawings, specifically to FIGS. 1 and 2, the sound system of the invention contemplates that a control console 10 be situated at a remote location in the auditorium where the console operator commands a view of the entire seating arrangement, such as a balcony or choir loft. For convenience, the console 10 may be mounted on a desk 12 of like structure. The console 10 houses a number of relays, as will be described more fully hereinafter, and includes a top panel 14 which displays a plurality of push-button light switches 16. Advantageously, the push-button light switches 16 positionally duplicate the seating arrangement of the auditorium; and it has proved desirable to have the switches 16 duplicate the auditorium seats in one-for-one or one-for-two correspondence. Accordingly, an audience participant can be located visually in the seats and confirmed by the glowing of the lamp in the corresponding switch 16.

The panel 14 also displays a dim reset push-button switch 18 and a bright reset push-button switch 20, the purpose and operation of these latter switches to be described more fully hereinafter. In addition, a volume control knob 22 for the loudspeakers of the audience participation system and a volume control knob 24 for the loudspeakers of the stage or platform sound system are incorporated in the panel 14. Meters having graduated dials 26 and 28 may be conveniently included for providing a scalar indication of the volume level for the audience loudspeaker system and the platform loudspeaker system respectively.

Figures 3, 4:
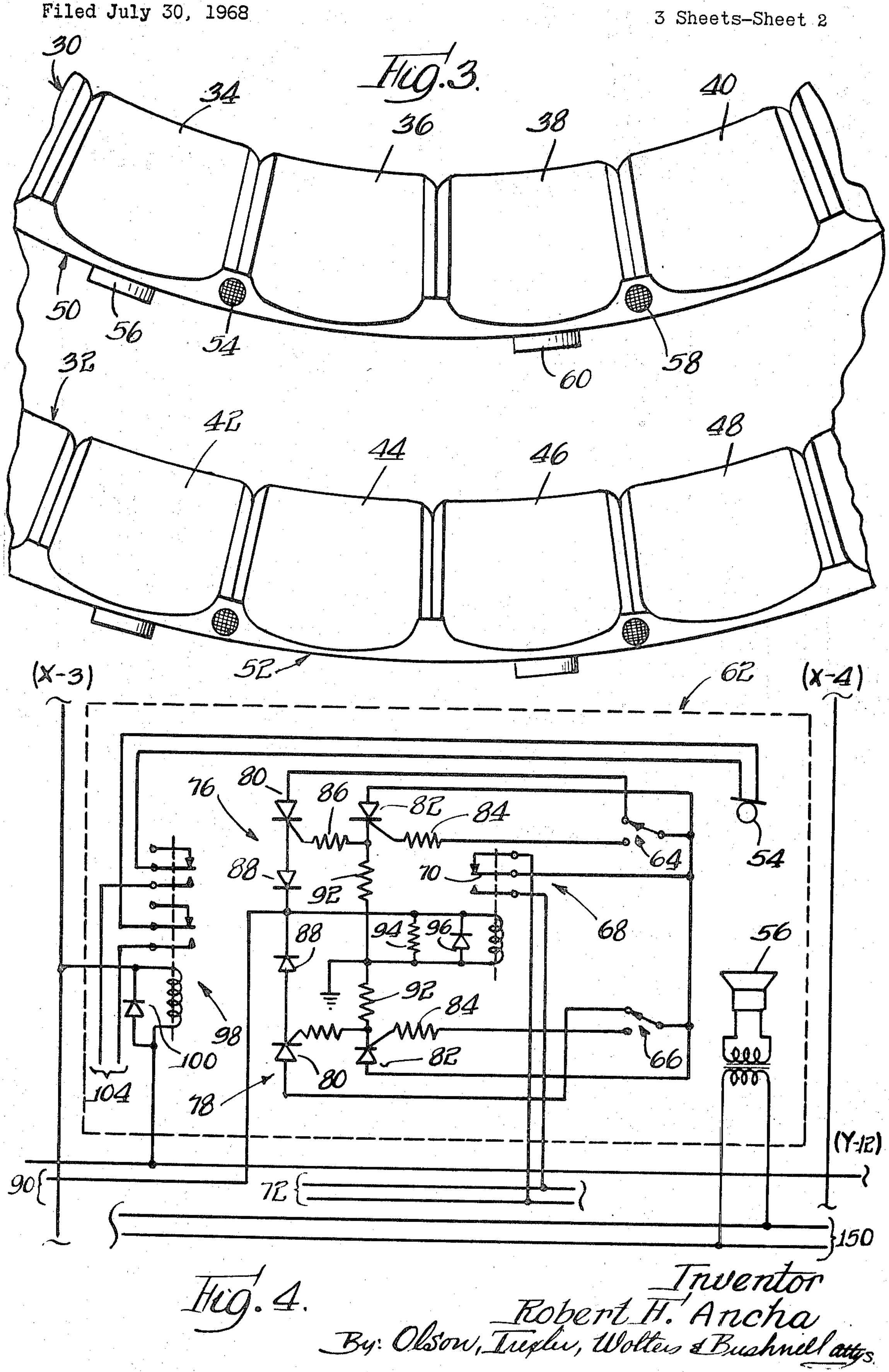
FIG. 3 is a plan view of an auditorium seating arrangement incorporating circuit elements in compliance with the principles of the present invention.
FIG. 4 is a schematic circuit diagram of a typical seat circuit module for use in the sound system of the invention.

As will be appreciated, conventional seating arrangements in which the individual seats are arranged in rows running from the left to the right of an auditorium and in columns running from the front to the rear defines a rectangular or X–Y matrix in which the rows represent the ordinate values and the columns the abscissa values. It will also be appreciated that the rows need not traverse straight lines but may define a family of similar curves without distorting the X–Y matrix relationship. In FIG. 3, two rows of seats indicated generally by the reference numerals 30 and 32 constitute, in compliance with the matrix relationship, a seat row Y–11 and a rearwardly next adjacent seat row Y–12. The individual seats in the illustrated portion of row 30 are successively designated by the reference numerals 34, 36, 38 and 40 respectively; and the individual seats in the illustrated portion of row 32 are successively designated by the reference numerals 42, 44, 46 and 48. It will be recognized, that adjacent pairs of seats may be considered together for wiring of the sound system of the invention, or each column of seats may be considered individually. For the purposes of the illustrated embodiment, seats 36 and 44 will be considered as part of a seat column X–3; and seats 40 and 48 will be considered as the next laterally adjacent seat column, column X–4. Each section of seats in a given row is advantageously provided with a common back structure, back structure 50 for row 30 and back structure 52 for row 32 for example.

In compliance with the features of the present invention, microphone and switching circuits are disposed individually at the auditorium seats, signalling means and canceling switches are disposed at the console 10, and elements of information circuitry are divided between the console and seat locations. Such arrangements have greatly simplified the wiring of an installation. In further compliance with the features of the present invention, the microphone and switching circuits are interconnected by a rectangular or X–Y matrix system of cables corresponding generally with the coordinate system described with reference to the seating arrangement of FIG. 3, the X-lines being adapted for connection to the positive pole of a potential source and the Y-lines being connected to the corresponding negative pole. Other cables are of course provided as is necessary to complete the information circuitry. In accord with the illustrated embodiment, one microphone and one loudspeaker are provided for each pair of auditorium seats. As is shown in FIG. 3, an audience microphone 54 and a loudspeaker 56 are provided for the pair of seats 42 and 44; and an audience microphone 58 and a loudspeaker 60 are provided for the pair of seats 46 and 48. As will be recognized, each loudspeaker and each audience microphone may be also employed to cover more than a pair of seats or an individual seat as is dictated by the acoustics of the site and the economics of the particular situation.

Turning to FIG. 4, the audience microphone 54 and the loudspeaker 56 are arranged in a typical seat circuit module 62 which additionally includes a pair of single pole switches 64 and 66. Switches 64 and 66 are associated respectively with the seats 42 and 44 and generally comprise sensing means for determining the condition of the corresponding auditorium seat, i.e. whether the corresponding seat is occupied or unoccupied. Conveniently, the switches 64 and 66 are therefore position responsive switches which are disposed normally in the configuration shown in the drawing when the corresponding seat is "up," i.e. unoccupied. Direct current power is supplied to the module 62 for the switches 64 and 66 through a canceling relay 68 which comprises a movable contact 70 that is connected to supply both switches 64 and 66. The corresponding fixed contacts of relay 68 are connected to a pair of leads 72; and turning to FIG. 5, the leads 72 are connected to a regulated 10-volt source 74 of direct current power as parallel circuit elements including respectively the dim reset switch 18 and the bright reset switch 20.

Returning to FIG. 4, the seat circuit module 62, in compliance with the features of the present invention, includes identical memory circuits 76 and 78 which are energized respectively through the switches 64 and 66. The memory circuits are provided with circuit elements that are arranged to retain information concerning the previous condition of the corresponding auditorium seat. More specifically, each of the information circuits includes a pair of silicon controlled rectifiers 80 and 82, the anode of each rectifier 82 being connected substantially continuously to the regulated 10-volt operating potential through the movable contact 70 of relay 68. Cooperatively, the anodes of rectifiers 80 are connected to this positive potential only when the corresponding position responsive switch is in the normal or "up" position.

Figure 5:
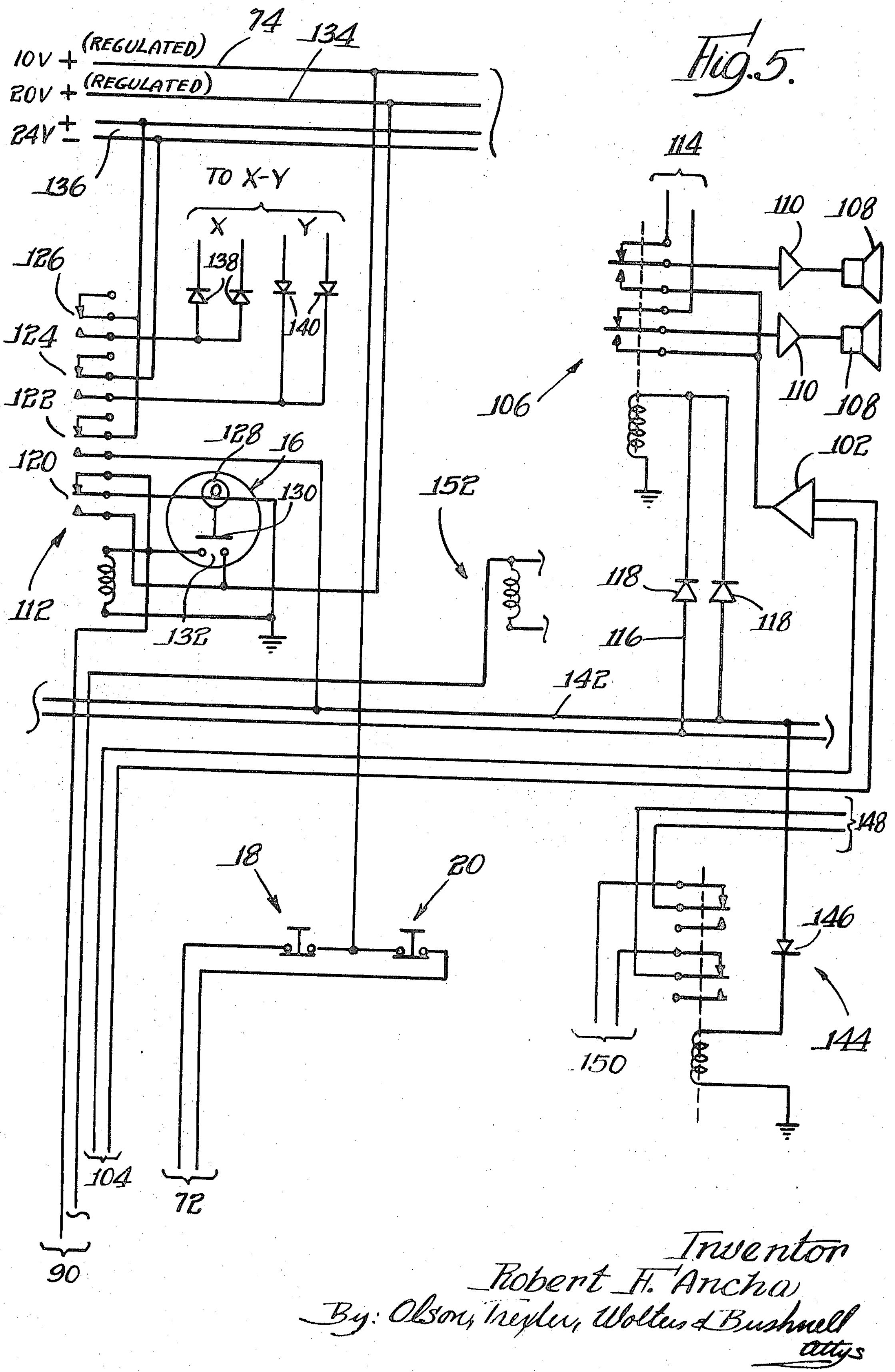
FIG. 5 is a schematic circuit diagram showing the companion console circuit module and loudspeaker arrangement.

The gate electrode of rectifier 82 is connected to the "down" position contact of the corresponding position responsive switch through a clamping resistor 84, and the cathode of rectifier 82 is connected to the gate electrode of rectifier 80 through a clamping resistor 86 in order to control conduction through the rectifier 80 in a manner to be described more fully hereinafter. The output of rectifier 80 is passed through a forward biasing diode 88 to the corresponding push-button light switch 16 by a conductor or lead 90 as is generally shown in FIGS. 4 and 5. A leakage circuit to ground is also provided from the cathode of each silicon controlled rectifier 82 through a load resistor 92. The conductor 90 receives the output from the forward biasing diodes 88 and is connected in series with the coil of relay 68 to provide canceling as will be described more fully hereinafter. In addition, an overload device consisting of a resistor 94 in parallel with a blocking diode 96 is advantageously provided in the circuit with the relay coil.

The output signal leads from the seat microphone 54 are connected to the movable contacts of a double-pole, microphone control relay 98, relay 98 having its coil connected across the matrix junction conductors designated by the coordinates X–3, Y–12, a forward biasing diode 100 being connected across the coil of relay 98 to insure unidirectional conduction and eliminate a possible cause of intermittent noise in the system. The movable contacts of relay 98 are normally disposed in an open circuit condition as shown in the drawing; and upon energization of the coil of relay 98, the movable contacts are actuated to complete a circuit from the microphone 54 to a first stage amplifier 102, shown in FIG. 5, through a pair of leads designated 104.

Continuing now with reference to FIG. 5, the output of amplifier 102 is passed to a pair of normally open, fixed contacts of a double-pole, loudspeaker control relay 106; and each of the corresponding movable contacts of relay 106 is individually connected to a seat microphone loudspeaker 108 through a second stage amplifier 110, the speakers 108 being conveniently located at the front of the auditorium, as part of a master loudspeaker complex for example. The coil of relay 106 is selectively energized to complete the circuits from amplifier 102 to the amplifiers 110 by means of a console control relay 112 which also operates to impress potential on suitable matrix conductors and which incorporates the push-button light switch 16 that is associated with the seat circuit module 62. As will be appreciated, the normally closed, fixed contacts of relay 106 may be connected to a platform microphone preamplifier through the leads 114. Similarly, the coil of relay 106 may be energized from other console control relays by means of a lead 116. The latter arrangement provides augmented seat microphone loudspeaker coverage where desired. Advantageously, each of the input leads to the coil of relay 106 incorporates a forward biasing diode 118.

The console control relay 112 receives information potential from the memory circuits of seat circuit module 62; and the relay 112 includes four double pole switches, switches 120, 122, 124 and 126. The potential conducted by either of the silicon controlled rectifiers 82 in circuit module 62 is passed by the normally closed contacts of switch 120 to energize the filament of lamp portion 128 of the push-button light switch 16. A signal is thus provided on the front panel of the console indicating which console circuit module is associated with the matrix coordinates that represent the audience participant who has risen from his seat to speak. Since the potential conducted by the silicon controlled rectifiers is derived from the 10-volt regulated source 74, the filament of lamp 128 is energized with relatively low potential and therefore glows dimly. The push-button light switch 16 also includes a shorting bar 130 that is arranged to be manipulated manually by the console operator for momentarily closing a pair of normally open contacts 132. Completion of the circuit through contacts 132 energizes the coil of relay 112 from a regulated 20-volt source 134 of direct current power; and since the relay 112 is arranged to be actuated by this higher potential but not by the lower potential from the silicon control rectifiers, the coil of relay 112 thereupon acts to pull in the movable contacts whereby to energize the appropriate matrix conductors through the normally open contacts of switches 124 and 126. The circuit is arranged for energization of the matrix conductors from a 24-volt direct current source 136. In addition, the circuit is arranged to energize the coil of relay 106 through the normally open contact of switch 122. At this stage in the circuit operation, the filament of lamp 128 is powered from the source 134. Because of its higher voltage, the source 134 causes the filament of lamp 128 to glow brightly, indicating that the seat microphone circuit is ready for the audience participant. Advantageously, forward biasing diodes 138 and 140 are included in the various legs of the abscissa and the ordinate matrix leads respectively.

A circulating line 142 connects the normally open contact of switch 122 with the coil of relay 106 and with the coil of a platform microphone control relay 144, a forward biasing diode 146 being usefully included in series with the coil of relay 144. The movable contacts of relay 146 are connected to the output of the primary amplifiers for the platform microphones through leads 148, and the normally closed fixed contacts of relay 144 are connected to a circulating speaker line 150. As is shown in FIG. 4, the line 150 is inductively coupled to the loudspeaker in each of the seat circuit modules.

As has been described hereinabove, a push-button light switch 16 is associated with each of the auditorium seats, and a console control relay, such as relay 112, is therefore associated with each of the switches 16. A second of the plurality of console control relays is suggested at 152 in FIG. 5; and it will be appreciated that the seat circuit modules, such as the circuit module 62, as well as the console circuit modules, will be multiplied to provide the desired degree of audience participation coverage.

Having thus described one construction of the invention, it is important now to state how the illustrated embodiment operates.

Assuming that the testimonial sound system of the invention has been appropriately installed in an auditorium and that all elements of the system have been prepared for use by the audience participants, all of the seats in the auditorium, such as the seats 42 and 44, will be disposed in the "up" condition. The switches 64 and 66 which are associated with the seats 42 and 44 will correspondingly be configurated in the condition shown in FIG. 4. The system is thus readied for use, and no current flows in any part of the system, When a member of the audience enters the auditorium and seats himself in the seat 42, the movable contact of switch 64 will be repositioned by the movement of the seat to connect the gate electrode of the corresponding silicon controlled rectifier 82 to the source 74 of positive potential through the dim reset switch 18 and the normally closed contact of canceling relay 68. Since the anode of rectifier 82 is also connected to this source of positive potential, the rectifier will now conduct and impress a positive voltage on the gate electrode of silicon controlled rectifier 80. However, no voltage appears at the anode of this latter circuit element, and accordingly, it does not conduct.

In the event that the person occupying seat 42 arises, indicating his desire to participate in the ceremonies, switch 64 will again be configurated in the normal condition shown in FIG. 4. Rectifier 82 will, nevertheless, continue to conduct because the breakdown voltage will have previously been reached and continued positive potential on its gate electrode will therefore be unnecessary for continued conduction. Accordingly, rectifier 82 will continue to impress positive potential on the gate electrode of rectifier 80; but with switch 64 now positioned to energize the anode of rectifier 80, that circuit element will conduct, passing 10-volt positive potential through the line 90 to the console control relay 112. This potential will energize the filament of lamp 128 through the normally closed contact of switch 120 but, being of insufficient voltage to cause the relay to pull in, will not alter the normal condition of the relay switches. As pointed out hereinabove, the lamp 128 will, at this time, glow dimly indicating to the console operator the particular switch 16 which is associated with the person who has arisen from seat 42. If the console operator wishes to recognize the person from seat 42, the operator need only depress the push-button which actuates shorting bar 130 whereby to close the contacts 132 momentarily. This actuation of the shorting bar 130 will complete a circuit from the 20-volt source 134 through the lamp 128, causing it to glow brightly, and through the coil of console control relay 112. Since the force thus induced in the coil of the relay is sufficient to attract the armature thereof, the movable contacts of switches 120–126 will be thereupon repositioned to close circuits through the normally open contacts thereof. The potential from source 134 also appears at the coil of relay 68; and since this latter voltage is sufficient to actuate the relay 68, the movable contact 70 is repositioned to cause current to flow through bright reset switch 20.

The lamp 128 will be glowing brightly at this time; and when the console operator releases the push-button of switch 16, the shorting bar 130 will be repositioned by its mechanical bias to open the contacts 132. However, the 10-volt potential from rectifier 80 will be sufficient to hold in or maintain the relay 112. Accordingly, the switches 120–126 will continue to have circuits completed through their normally open contacts and the circuits to the matrix conductors will be energized from the 24-volt source 126 through the diodes 138 and 140. The coil of relay 98 will thus be energized, completing a circuit from the seat microphone 54, through the normally open contacts of relay 98 and through the leads 104 to the amplifier 102.

The coil of relay 106 will be energized from the 24-volt source 136 through the normally open contact 122, and this energization of relay 106 will cause the movable contacts thereof to be repositioned so as to open circuits to the platform microphone preamplifier, through the leads 114, and to close circuits through the normally open contacts of the relay whereby to impress the output from amplifier 102 on the loudspeakers 108. The coil of relay 144 will also be energized through the normally open contact of switch 122, decoupling loudspeaker 56 and a selected number of similar speakers within the range of normal audition from the seat 42 in order to avoid undesirable feedback through the system. Thus, the speech of the audience participant from seat 42 will be picked up, amplified and disseminated in a clear and understandable condition to the entire audience.

In the normal course of events, when the person associated with seat 42 ceases his participation in the ceremony and reseats himself, the switch 64 will again be configurated in the "down" position. The switch 64 will thus remove potential from the anode of the controlled rectifier 80, and it will no longer conduct. The relays 68 and 112 will thereby be deactivated; and the relays 98, 106 and 144 will, in turn, be deactivated through the restoring of relay 112 to its normal condition. The seat microphones will be thus automatically canceled and the various loudspeakers restored to their normal condition.

In the event that the participant from seat 42 attempts to overextend his participation or otherwise gives indication that his further participation is not desired, the console operator may depress the bright reset switch 20 to provide selective cancellation of the circuitry. Momentary depressing of the push-button of switch 20 opens the circuit at the normally open contacts of relay 68 which are being held closed by the coil of the relay at this period in the operation of the system. This momentary interruption removes potential from the anode of controlled rectifier 80 and effects cancellation as previously described.

Prior to actual start of the ceremonies, persons may rise from their seats to leave the auditorium or to change seats. In order that the corresponding memory circuits will not be conditioned for conduction, all of the circuits may be properly restored at the beginning of the ceremony by a momentary depressing of the push-button of the dim reset switch 18.

It will be appreciated that the illustrated circuitry will be multiplied in order to provide microphone and loudspeaker coverage for the entire auditorium. However, because of the described arrangement of the switching and information circuitry, together with the matrix conductor system, wiring of the auditorium will be considerably simplified and thorough microphone and loudspeaker coverage will be practicable.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated in the following claims.

This invention is claimed as follows:

1. A sound system comprising: a source of direct current power; a first and second plurality of electrical conductors arranged respectively as the columns and rows of a rectangular matrix and connectible respectively to the positive and negative terminals of said power source; loudspeaker means; a plurality of microphone and switching circuits adapted to be disposed individually at seats of an auditorium arrangement, each of said microphone and switching circuits including a control relay having a coil connected to a said first conductor and to one of said second conductors forming a matrix junction with the said first conductor, and a microphone connectible to said loudspeaker means through the contacts of said control relay; and information circuit means electrically connected in circuit between said power source and said control relay for selectively completing and breaking circuits from said microphone to said loudspeaker means, said information circuit means including position responsive switch means for sensing the occupancy condition of an auditorium seat with which the corresponding microphone and switching circuit is associated and circuit elements arranged to respond to changes in the occupancy condition of the seat, said circuit elements including a first and a second silicon control rectifier, the anode of said first rectifier being connected substantially continuously to operating potential, the gate electrode of said second rectifier being connected to the cathode of said first rectifier and the anode of said second rectifier being selectively energized through said position responsive switch means whereby said second rectifier is rendered conductive and nonconductive for controlling the associated microphone and loudspeaker means when said switch means is caused to be repositioned by changes in the occupancy condition of the corresponding seat.

2. A sound system according to claim 1 wherein said information circuit means further includes a console circuit having a relay connected to the cathode of said second rectifier and arranged to be operated into condition energizing said plurality of conductors from said power source by means including said second rectifier.

3. A sound system according to claim 1, wherein said system further comprises a first and a second manual switch means; and a second source of direct current power, and wherein said information circuit means further includes a relay having a movable contact connected in power supplying relationship in said information circuit means and having a pair of fixed contacts connected individually to said source of power through corresponding manual switch means whereby to permit manual deenergization of said information circuit means.

4. A sound system according to claim 3 wherein said manual switch means includes signal lamp means for indicating the conductive condition of the circuit in which the manual switch means is located.

5. A sound system according to claim 1 wherein said information circuit means includes main console circuit means arranged to be disposed remotely with respect to said microphone and switching circuits and including a signal lamp and a selector switch electrically connected to each of said microphone and switching circuits.

References Cited

UNITED STATES PATENTS

| | | | |
|---|---|---|---|
| 1,383,750 | 7/1921 | Parker et al. | 340—166 |
| 2,453,838 | 11/1948 | Fletcher et al. | 179—1 |
| 2,663,850 | 12/1953 | Mellinger et al. | 179—1 |

KATHLEEN H. CLAFFY, Primary Examiner

D. W. OLMS, Assistant Examiner

UNITED STATES PATENT OFFICE
CERTIFICATE OF CORRECTION

Patent No. 3,538,254 Dated November 3, 1970

Inventor(s) Robert F. Ancha

It is certified that error appears in the above-identified patent and that said Letters Patent are hereby corrected as shown below:

Column 8, line 27, after "said" insert -- second --

Signed and sealed this 6th day of April 1971.

(SEAL)
Attest:

EDWARD M.FLETCHER,JR.
Attesting Officer

WILLIAM E. SCHUYLER, JR.
Commissioner of Patents

FORM PO-1050 (10-69)